United States Patent [19]
Wytkin

[11] Patent Number: 5,989,008
[45] Date of Patent: Nov. 23, 1999

[54] MULTILAYER MOULD APPARATUS AND METHOD

[76] Inventor: Andrew J Wytkin, Unit 4, 40 Banksia Street, Kensington, 6151 Western, Australia

[21] Appl. No.: 08/836,444

[22] PCT Filed: Nov. 3, 1995

[86] PCT No.: PCT/AU95/00738

§ 371 Date: May 2, 1997

§ 102(e) Date: May 2, 1997

[87] PCT Pub. No.: WO96/14196

PCT Pub. Date: May 17, 1996

[30] Foreign Application Priority Data

Nov. 4, 1994 [AU] Australia ............................ PM9220
Jan. 31, 1995 [AU] Australia ............................ PN0805

[51] Int. Cl.$^6$ ............................................. B29C 33/02
[52] U.S. Cl. .......................... 425/432; 249/78; 249/79
[58] Field of Search ........................ 425/432; 249/78, 249/79, 115, 134

[56] References Cited

U.S. PATENT DOCUMENTS

| 2,979,773 | 4/1961 | Bolstad . | |
|---|---|---|---|
| 3,387,333 | 6/1968 | Irvine et al. | 249/78 |
| 4,563,145 | 1/1986 | De Meij | 249/78 |
| 4,964,943 | 10/1990 | Kruger et al. | 249/79 |
| 5,064,597 | 11/1991 | Kim . | |
| 5,094,607 | 3/1992 | Masters . | |
| 5,176,839 | 1/1993 | Kim | 249/78 |
| 5,260,014 | 11/1993 | Holton et al. . | |

FOREIGN PATENT DOCUMENTS

| 0 164 259 | 12/1985 | European Pat. Off. . |
|---|---|---|
| 0 218 038 | 4/1987 | European Pat. Off. . |
| 0 505 738 | 9/1992 | European Pat. Off. . |
| 8 94 040 | 12/1944 | France . |
| 2 228 589 | 12/1974 | France . |
| 30 17 559 | 11/1981 | Germany . |
| 37 17 609 | 12/1988 | Germany . |
| 2 172 542 | 9/1986 | United Kingdom . |

OTHER PUBLICATIONS

Patent Abstracts of Japan, vol. 12, No. 1 (M–656), Jan. 6, 1988, and JP62–167014, Jul. 1987.
Abstract of Japanese Application No. 63–84593 of Kouichirou Uezono, JP1–255510, Oct. 1989.
Abstract of Japanese Application No. 63–240360 of Hiroyasu Ogawa, JP2–88204, Mar. 1990.

*Primary Examiner*—James P. Mackey
*Attorney, Agent, or Firm*—McCormick, Paulding & Huber

[57] ABSTRACT

A mould apparatus for moulding materials such as thermoplastics includes a first layer of mould material and a second layer contiguous to the first layer. The second layer contains heating devices such as resistance wires, whereby in use, the heating devices heat the second layer so as to transfer heat to the first layer.

10 Claims, 15 Drawing Sheets

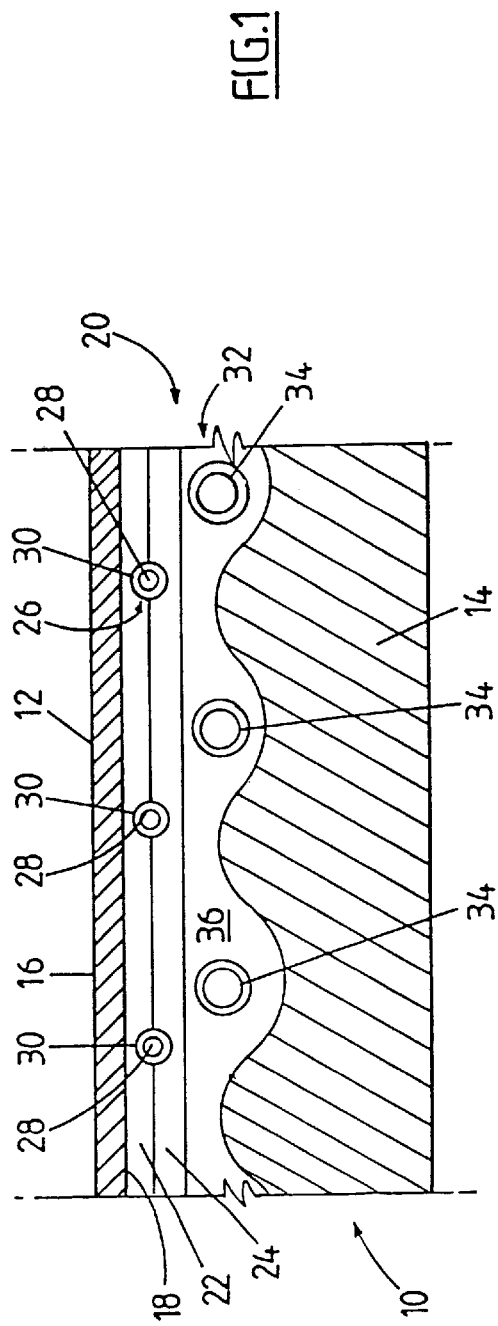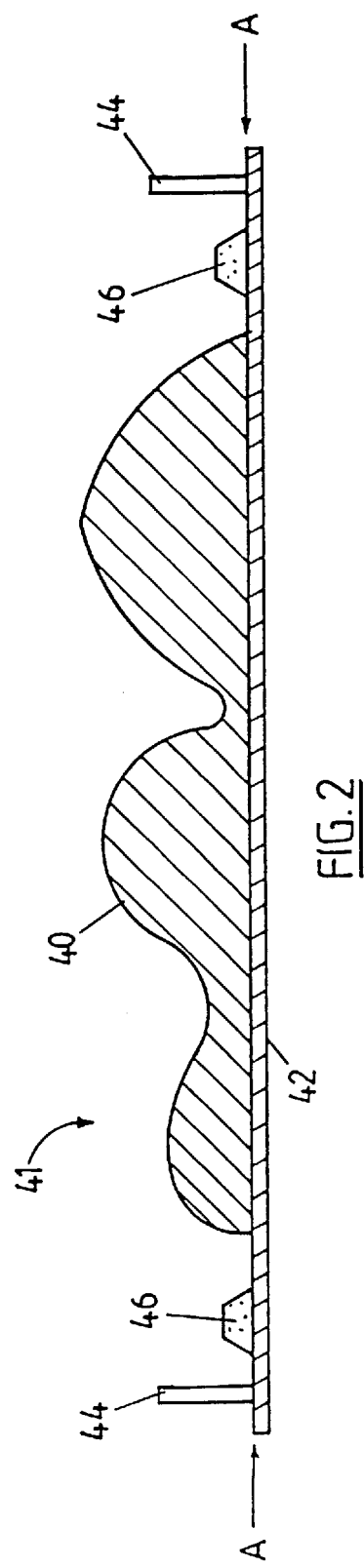

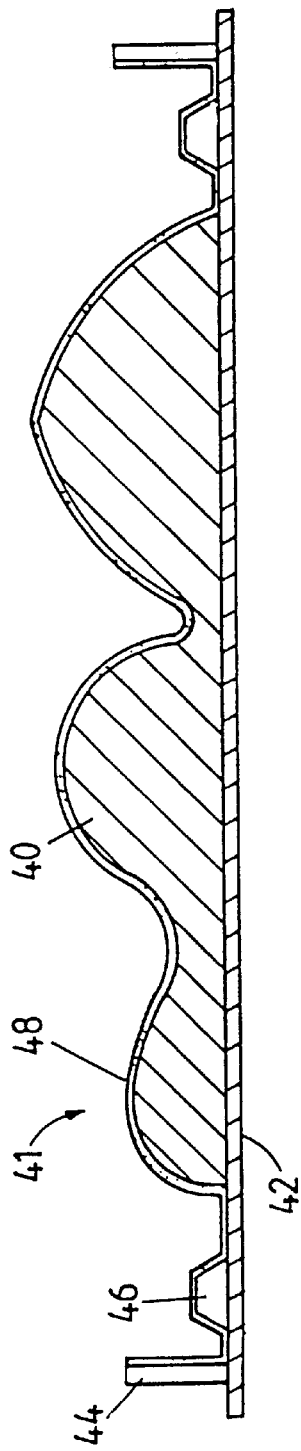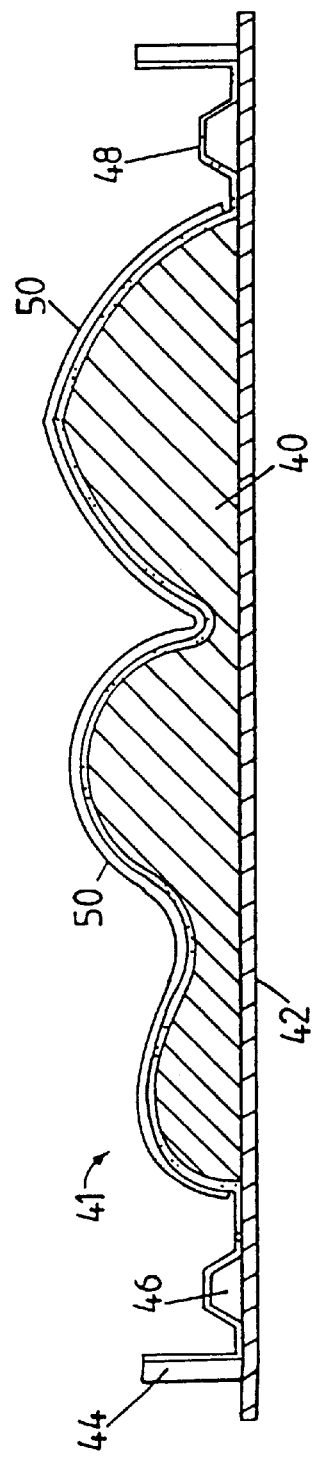

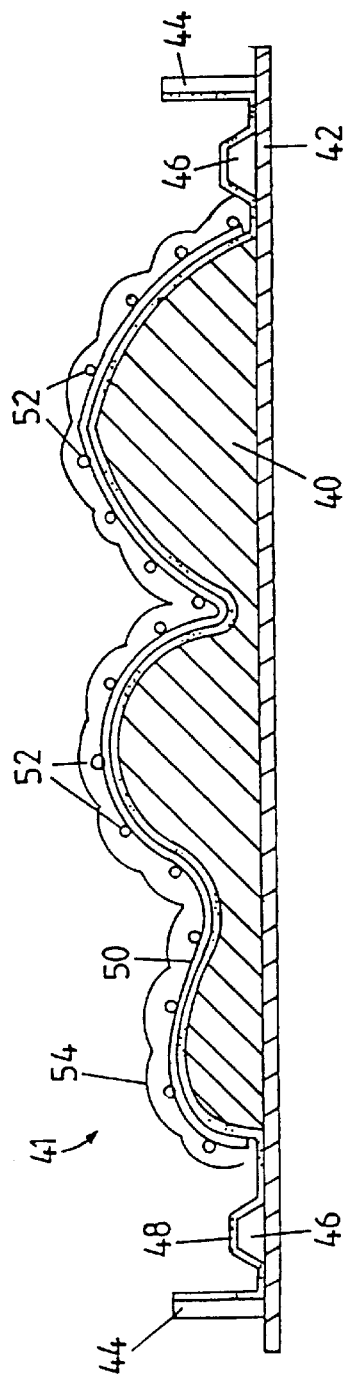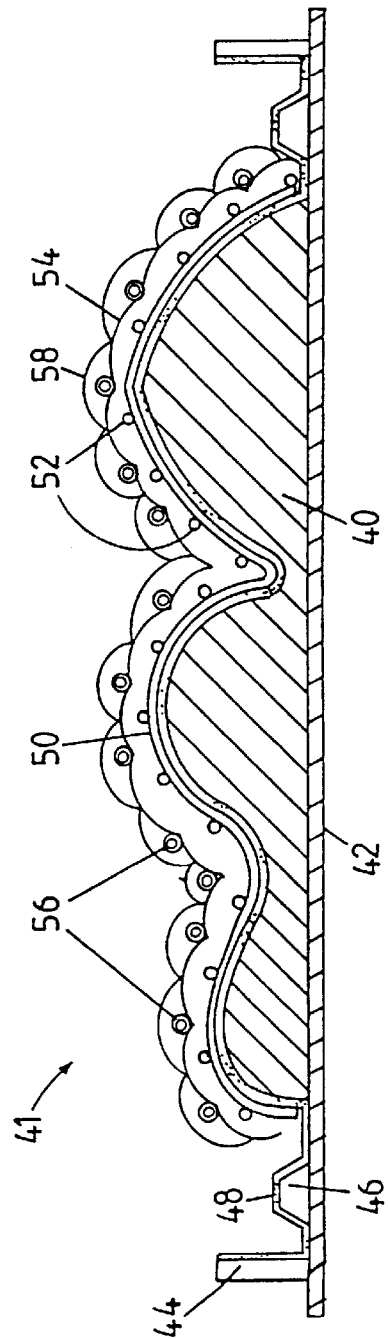

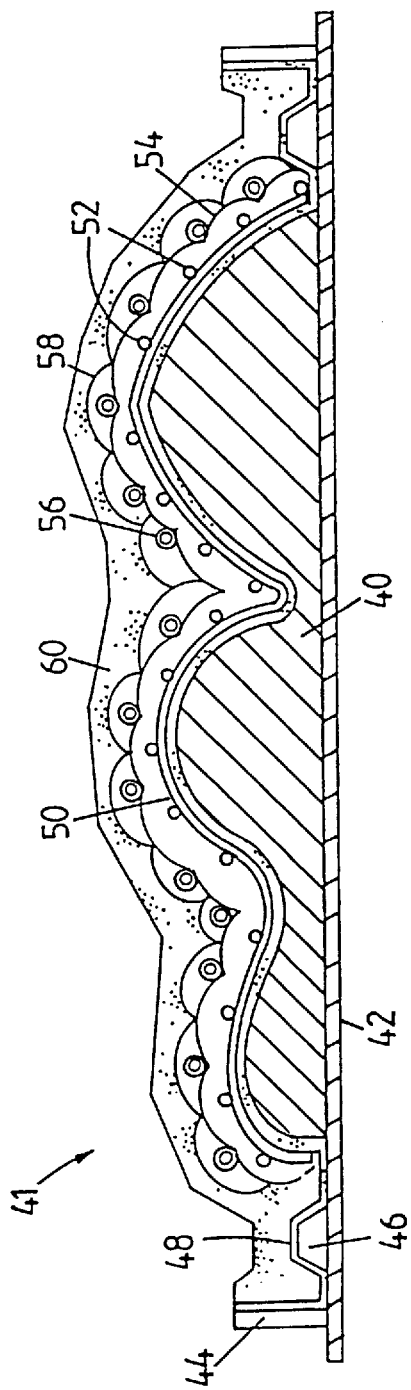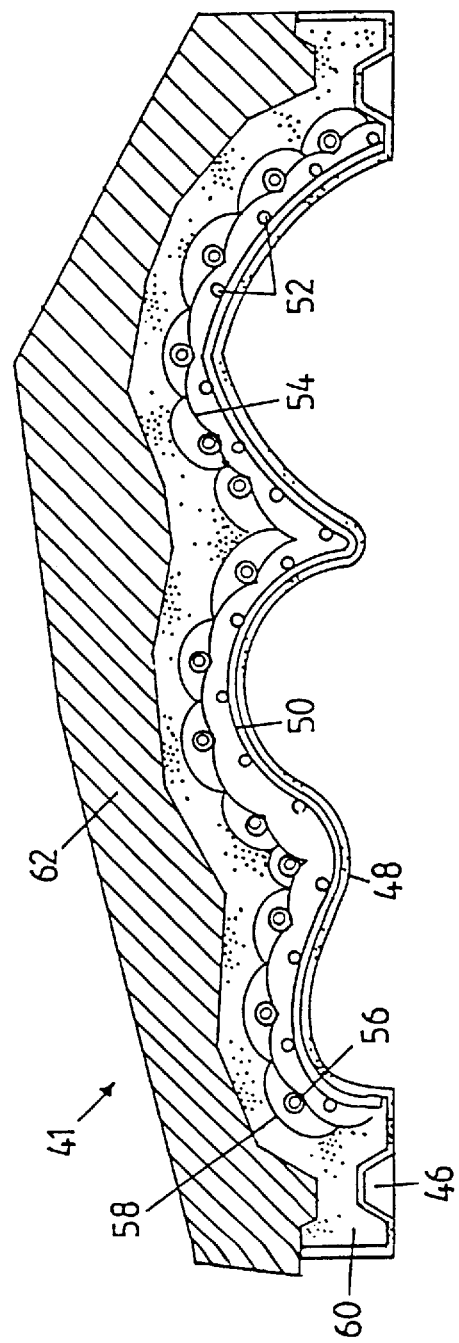

5,989,008

MULTILAYER MOULD APPARATUS AND METHOD

BACKGROUND OF THE INVENTION

FIELD OF THE INVENTION

The present invention relates to a mould apparatus for moulding materials such as thermoplastics and the like, and a method for moulding. The present invention is applicable to rotational moulding, injection moulding and other moulding processes.

BRIEF DESCRIPTION OF THE INVENTION

Moulding is a process for producing articles usually made of synthetic materials, such as plastics materials. Conventionally, the process uses a mould made out of sheet metal or some metal or alloy which is typically cast, fabricated, electroplated or metal sprayed. The most common form of moulds are cast aluminum and sheet metal. Plastics material granules or powder of thermoformed material are placed in the mould, or alternatively a thermoset plastics material in liquid form may be placed in the mould.

In rotational moulding the mould is rotated biaxially. Whilst rotating, the mould is placed in an oven and heated to approximately 200° C. When the plastics material is coated onto the mould surface and consolidated, the mould is then removed from the oven and cooled, usually by air and water sprays. When the plastics material has solidified in the mould and has cooled enough to maintain its shape, it is removed from the mould. Similarly, moulds produced by other methods are heated and cooled in a similar manner.

However, the above method has several disadvantages. Firstly, the energy required to maintain a temperature of 200° C. in the oven is considerable when compared with the temperature required to, melt the plastics material. Further, typically the mould is of considerable size and therefore much of the energy is absorbed by the mould, with comparatively little being transferred to the plastics material.

Further, forming a mould from sheet metal is typically not possible when the object to be moulded has compound curves.

Further, during the moulding process, small air bubbles may form and be trapped in the moulded material during the melt phase cycle. To remove the air bubbles it is necessary to increase the temperature and extend the time of the heating cycle. This requires more energy and time.

In addressing the disadvantages of conventional moulds, moulding apparatus formed of plastics material have been introduced.

U.S. Pat. No. 5,094,607 describes a mould for moulding thermoplastics material. The mould is constructed of a thermoset plastics material which has a heat distortion point greater than the thermoplastic material and, incorporates heat conductive modifiers in the thermoset plastics material. The heat conductive modifiers act to increase heat transfer when the mould is heated in a heating chamber or conventional oven.

U.S. Pat. No. 4,980,112 discloses a method for rotational moulding using a thermoset plastic mould as described in U.S. Pat. No. 5,0946,07.

The known prior art discloses thermoset plastic moulds which are typically heated by conventional means so that the mould is heated to fuse the thermoplastic material contained therein against an inner surface of the mould. To compensate for heating at lower temperatures and a low rate of heat transfer from the mould to the thermoplastic material heat conductive modifiers have been incorporated within the mould.

The present invention seeks to provide a mould apparatus which alleviates at least some of the problems of the prior art.

SUMMARY OF THE INVENTION

In accordance with one aspect of the present invention there is provided a mould apparatus for moulding materials characterised in that it includes a first layer of mould material, second layer disposed contiguous to the first layer, the second layer containing heating means such that in use the heating means heats the second layer so as to transfer heat to the first layer.

In accordance with a second aspect of the present invention there is provided a method of manufacturing a moulding apparatus charcterised in that it includes forming a pattern, applying a first layer of mould material to the pattern, applying a second layer containing heating means to the first layer so that the first and second layer are contiguous, and then removing the pattern.

BRIEF DESCRIPTION OF THE DRAWINGS

The present invention will now be described, by way of example, with reference to the accompanying drawings, in which:

FIG. 1 is a cross-sectional view of one embodiment of a mould in accordance with the present invention;

FIG. 2 to 8 are cross-sectional views showing progressive stages of a method of manufacturing a mould of FIG. 1;

DETAILED DESCRIPTION OF THE DRAWINGS

Figure 9:
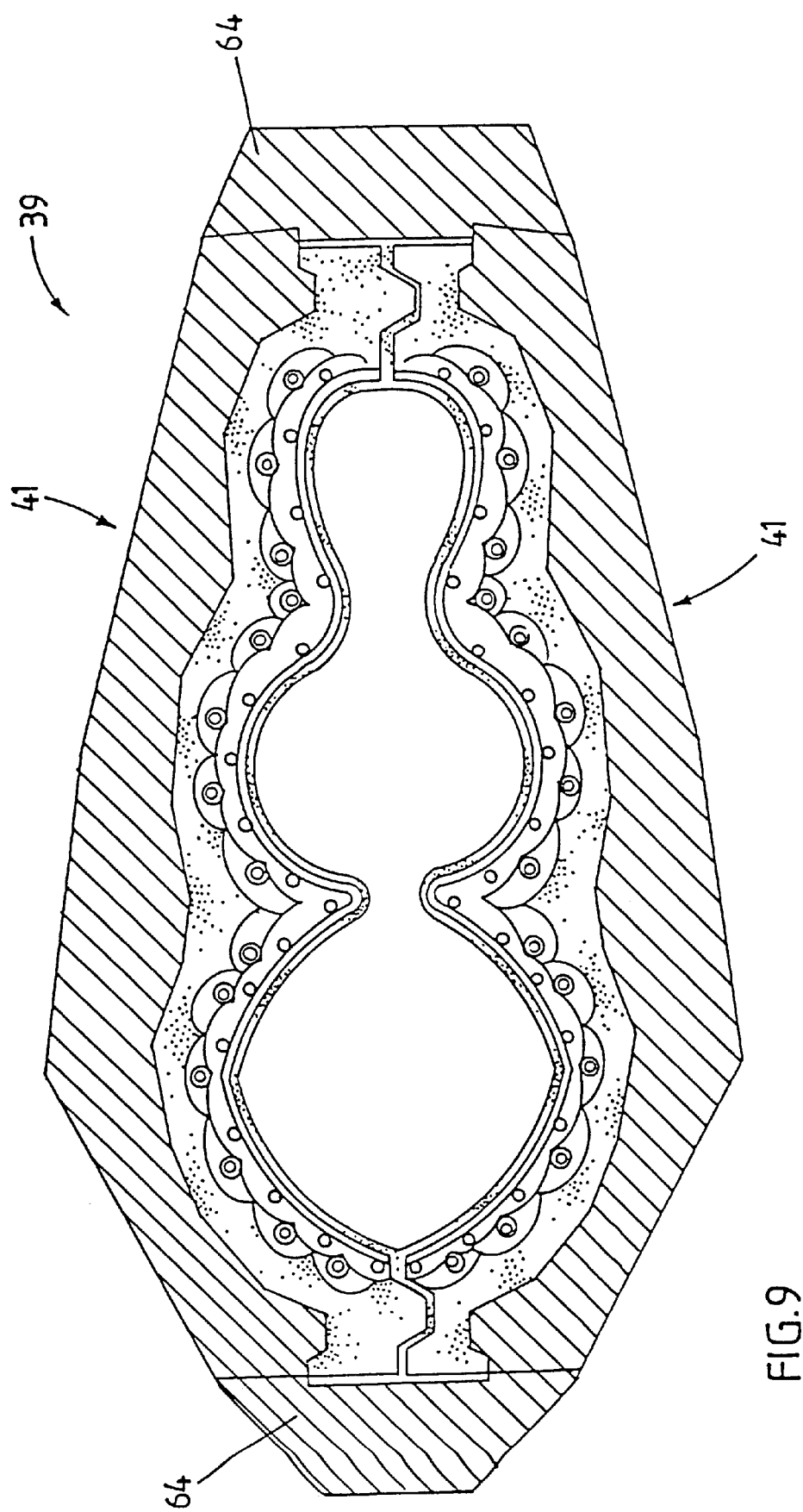
FIG. 9 is a cross-sectional view showing a mould produced by the method shown in FIGS. 2 to 8.

Shown in FIG. 1 is a cross-sectional view of a mould 10 for a mould apparatus including a layer of mould material 12 and a layer of thermally insulating material 14. The layer of mould material 12 has a first surface 16 and a second surface 18. The first surface 16 forms the mould face of the mould 10.

The mould 10 further comprises a heat transfer means 20, preferably the heat transfer means 20 comprises a first layer of thermally conductive material 22, a second layer of thermally conductive material 24 and a heating means 26. The heating means 26 comprises a plurality of resistance wires such as nichrome wires 28 arranged at spaced intervals along the mould 10. The nichrome wires 28 are provided between the layers of thermally conductive material 22 and 24. Further, if the layers of thermally conductive material 22 and 24 are electrically conductive, electrical insulation 30 may be provided around the nichrome wire 28. Preferably the electrical insulation 30 would be formed of thermally conductive materials, such as glass or ceramics.

Preferably, the layers of thermally conductive material 22 and 24 have considerably higher thermal conductivity than the layer of mould material 12. For example, the layer of mould material 12 may be formed of a high temperature deflection epoxy based resin, and the layers of thermally conductive material 22 and 24 may be formed of copper. Since the layers of thermally conductive material 22 and 24 have a considerably higher thermal conductivity than the layer of mould material 12, the layers of thermally conductive material 22 and 24 will be heated by the heating means 26 considerably faster than the rate at which heat will be transferred to the layer of mould material 12. As a result, the layer of mould material 12 will be evenly heated by the heating means 26, even though the nichrome wires 28 are provided at spaced intervals. This is because the first layer of thermally conductive material 22, which is attached to the second surface 18 of the layer of mould material 12, will be of a substantially uniform temperature.

The heat transfer means 20 further comprises a cooling means 32. The cooling means 32 comprises a plurality of cooling pipes 34, preferably formed of copper. The cooling pipes 34 are arranged at spaced intervals along the mould 10, intermediate the spacings of the nichrome wires 28. The cooling pipes 34 are attached to the second layer of thermally conductive material 24 by a layer of heat transfer cement 36. Preferably the heat transfer cement in the layer 36 has a thermal conductivity less than that of the layers of thermally conductive material 22 and 24, so that an even cooling is achieved.

The layer of thermally insulating material 14 surrounds the layer of heat transfer cement 36, such that the mould 10 is insulated from heat losses to surroundings.

Shown in FIGS. 2 to 9 are the steps involved in a method of manufacturing a mould 39 (see FIG. 9) for use in rotational plastics moulding. FIG. 2 shows a pattern 40, produced by known means mounted on a mounting plate 42. Manufacture of the pattern 40 is well known in the art and can be produced by a variety of methods. The pattern 40 represents the external surface of the article to be moulded. Typically, a mould is produced in a number of mould parts 41, and therefore partlines are needed. A partline is a join between two mould parts 41 of the mould 39, and the location of partlines on patterns is also well know. In FIG. 2, "AA" represent a partline of the pattern 40, along which the pattern 40 is mounted on the mounting plate 42. Upright boards 44 denote the perimeter of the mould part 41 to be produced. An alignment, bead 46 is provided on the mounting plate 42 spaced from the pattern 40. The alignment bead 46 is typically formed of plasticine and provides a tongue and groove parting line for the mould 39.

When the pattern 40 is mounted as shown in FIG. 3, a suitable release agent is applied to the pattern so that the mould part 41, when produced will be easily removable from the pattern 40.

Next, a high temperature deflection epoxy resin is laminated onto the mould part 41, covering the pattern 40, the alignment bead 46, the upright boards 44 and the mounting plate 42 in the area bounded by the upright boards 44. The high temperature deflection epoxy form an inside mould material 48, as can be seen in FIG. 3.

Next, a layer of thermally conductive material 50 is formed on the inside mould material 48 on the area which covers the pattern 40, as can be seen in FIG. 4. Typically, the first layer of thermally conductive material 50 is copper which is metal sprayed onto the inside mould material 48, to a thickness of 0.3 mm.

A plurally of glass insulated nichrome wires 52 are then layed across the first layer of thermally conductive material 50 and held in place with a heat resistant ceramic putty (not shown). A second layer of thermally conductive material 54 is then formed over the first layer of thermally conductive material 50 and the nichrome wires 52. Typically, the second layer of thermally conductive material 54 is formed of copper which is metal sprayed to a thickness of 0.3 mm, as can be seen in FIG. 5.

A plurality of cooling pipes 56 are then layed onto the second layer of thermally conductive material 54 and held in place by a layer of heat transfer cement 58. The cooling pipes 56 are provided in a spaced apart manner along the second layer of thermally conductive material 54, as can be seen in FIG. 6. Preferably the cooling pipes 56 are provided intermediate the nichrome wires 52.

Then, a layer of heat resistant epoxy putty 60 is laminated onto the mould part 41. If the mould part 41 is large, it may be necessary to include glass reinforcing lamination. Further, depending upon how the mould 39 is mounted on the rotation machine, it may be necessary to include spigots to pick up the mounting spider of the rotation machine. The mould part 41 with the layer of heat resistant epoxy putty 60 is shown in FIG. 7. Finally, a layer of insulation material 62, typically fibre glass, is laminated onto the mould part 41 as shown in FIG. 8.

The mould part 41 can then be removed from the pattern 40 and mounting plate 42. The process is then repeated along each partline until the required number of mould parts 41 have been produced.

Once all the mould parts 41 of the mould 39 have been produced, they can be assembled from the mould 39 as shown in FIG. 9. Where the mould parts 41 of the mould 39 meet, a further layer 64 of insulating material, such as fibre glass may be provided to prevent heat loss from ends of the mould 39.

In use, a mould 39 is manufactured according to the method described above. Connections for the nichrome wires 52 and cooling pipes 56 are made to provide a mechanism for heating and cooling the mould 39. Plastics material is placed in the mould 39, the mould 39 is mounted on a rotation machine and set rotating. Power is applied to the nichrome wires 52 which generate heat within the mould 39.

Use of the mould 39 of the present invention does not require an oven, which relies upon heat conduction from atmosphere to provide heating. The mould 39 of the present invention uses nichrome wires 52, provided within the mould 39 to provide heating thereof. Consequently, the heating is considerably more efficient than placing the mould 39 within an oven. Further, the thermal insulation layers 62 and 64 prevent heat loss from mould 39 to atmosphere.

Once heating has been completed, power to the nichrome wires 52 is removed. Air, water, oil or other suitable means is then pumped through the cooling pipes 56 to effect cooling of the mould 39.

Further it is envisaged that control may be provided over sections of nichrome wires 52 and cooling pipes 56 to achieve desired results. For example if an aperture is required in the plastics marterial, a number of the nichrome wires 52 could be switched off during the heating phase, and fluid could be provided to the cooling pipes 56 during the heating phase in the section where an aperture is desired. Therefore, the lack of heating in that section, combined with the active cooling would effectively produce an aperture in the mould where the plastics material did not melt.

When the mould 39 has cooled sufficiently for the plastics material to remain rigid, the mould 39 is dismantled and the moulded product removed therefrom.

Figure 10:
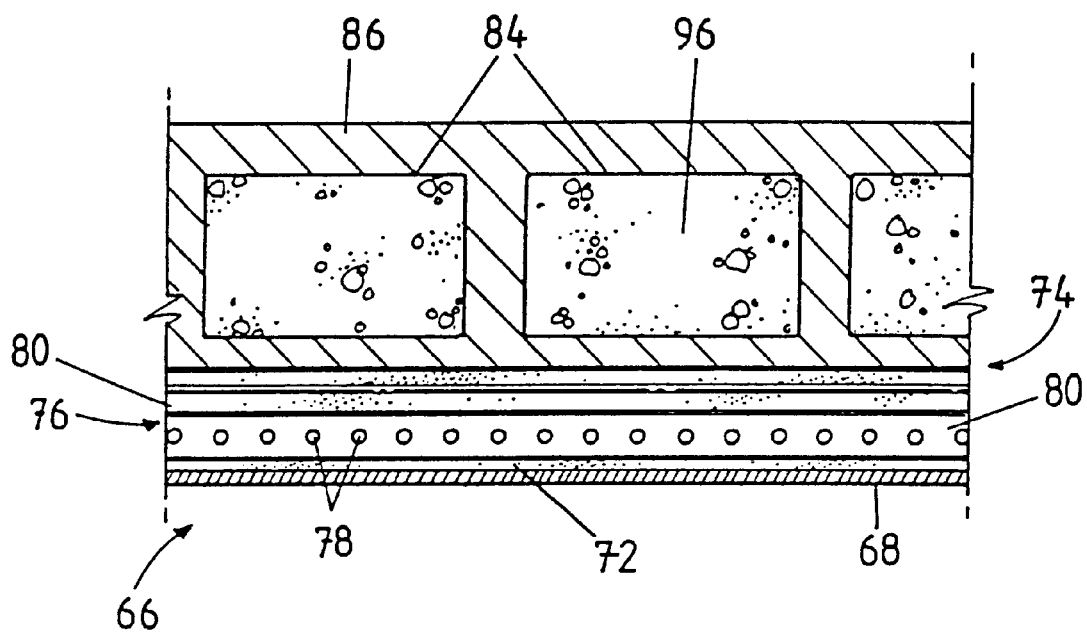
FIG. 10 is a cross sectional view of a second embodiment of a mould in accordance with the present invention.

Shown in FIG. 10 is a cross-sectional view of a second embodiment of a mould 66 in accordance with the present invention. The mould 66 includes a plurality of layers of mould material including a first layer of mould material 68.

The first layer of mould material 68 has a first surface 70. The first surface 70 forms the mould face of the mould 66.

The first layer of mould material 68 may be formed of a high temperature deflection epoxy resin, ceramics material, plastics material or other suitable material. Preferably, an additive such as silicone is added to the layer of mould material 68.

The mould 66 includes a second layer of mould material 72. The second layer of mould material 72 is preferably reinforced with a suitable material such as glass fibre.

The mould 66 further includes a heat transfer means 74. The heat transfer means 74 includes a heating means 76. The heating means 76 consists of a plurality of resistance wires, preferably nichrome wires 78.

Figure 11:
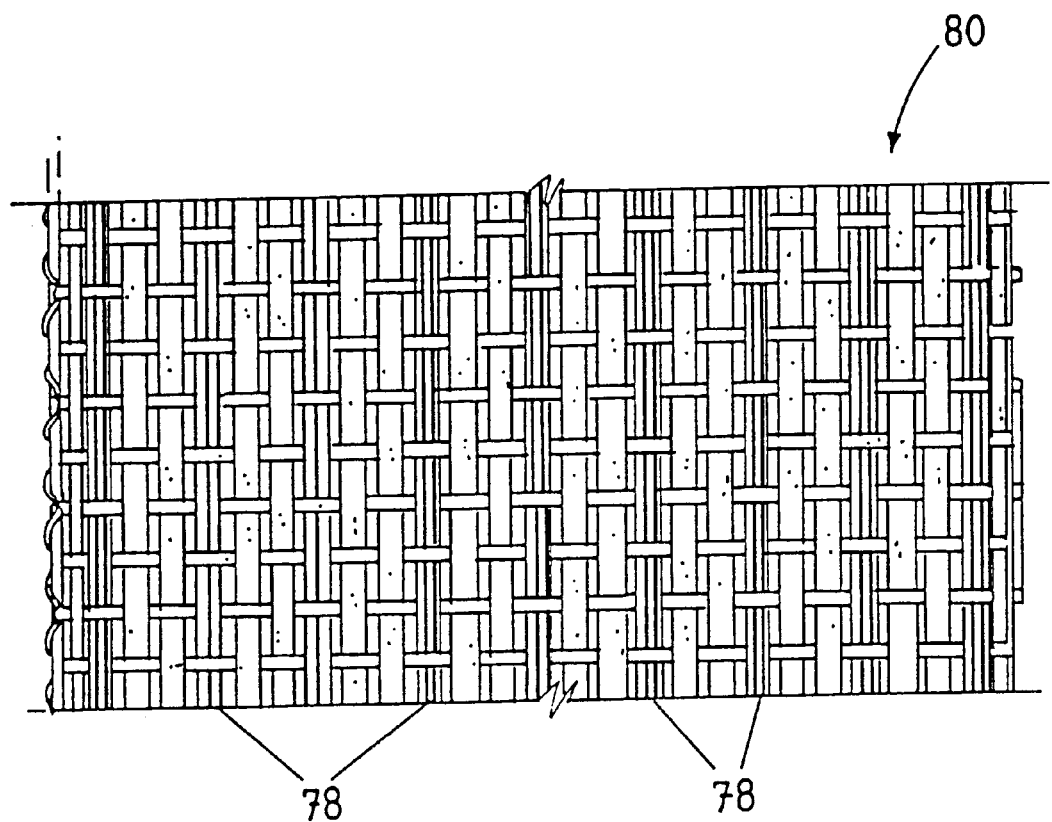
FIG. 11 is a view of a section of tape in accordance with the present invention.

The nichrome wires 78 are arranged at spaced intervals within at least one layer of fiberglass woven tape 80 as shown in FIG. 11. Preferably, the nichrome wires 78 are woven within the tape 80 parallel to each other. It is envisaged that other heat resistant materials could be utilized to form the tape 80. As can be seen in FIG. 10 two layers of tape 80 may be provided.

Typically, there are nine (9) nichrome wires 78 running in the warp direction of the tape 80 such that the nichrome wires are approximately 7 mm apart. As will be appreciated the number of nichrome wires 78 used and the configuration and spacing apart of the nichrome wires 78 can be varied.

The heat transfer means 74 further includes a cooling means 82. The cooling means 82 consists of a plurality of ducts 84 formed within a third layer of mould material 86. The ducts 84 are arranged at spaced intervals within the mould material 86 adjacent to the second layer of tape 80. Typically, the ducts 84 are interconnecting to receive a cooling medium introduced in known manner.

Shown in FIGS. 12 to 18 is a method of manufacturing the mould 66 for use in rotational plastics moulding. It is envisaged however that the mould could be used in other types of moulding.

Figure 12:
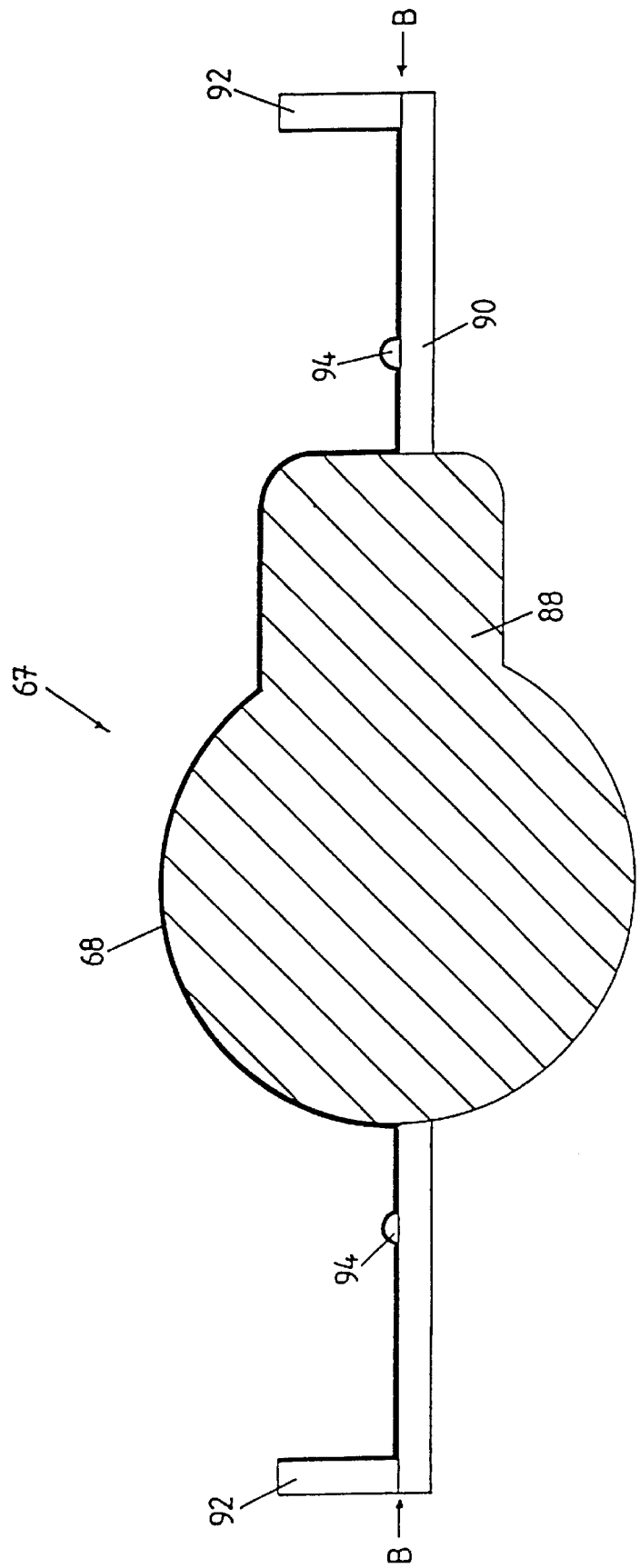
FIGS. 12 to 18 are cross-sectional view showing progressive stages of a method of manufacturing a mould of FIG. 10.

FIG. 12 shows a pattern 88, produced by known means supported by a mounting plate 90. In FIG. 12, "BB" represents a partline of the pattern 88. The partline is the join between two mould parts 67.

In like manner upright boards 92 and alignment means 94 are provided.

As can be seen in FIG. 12 the first layer of mould material 68 is laminated onto the mould part 67. The mould material 68 covers the pattern 88, the alignment means 94, the upright boards 92 and the mounting plate 90 in the area bounded by the upright boards 92. The mould material 68 forms an inside mould face.

Preferably, an additive such as silicone is added to the layer of mould material 68.

Figure 13:
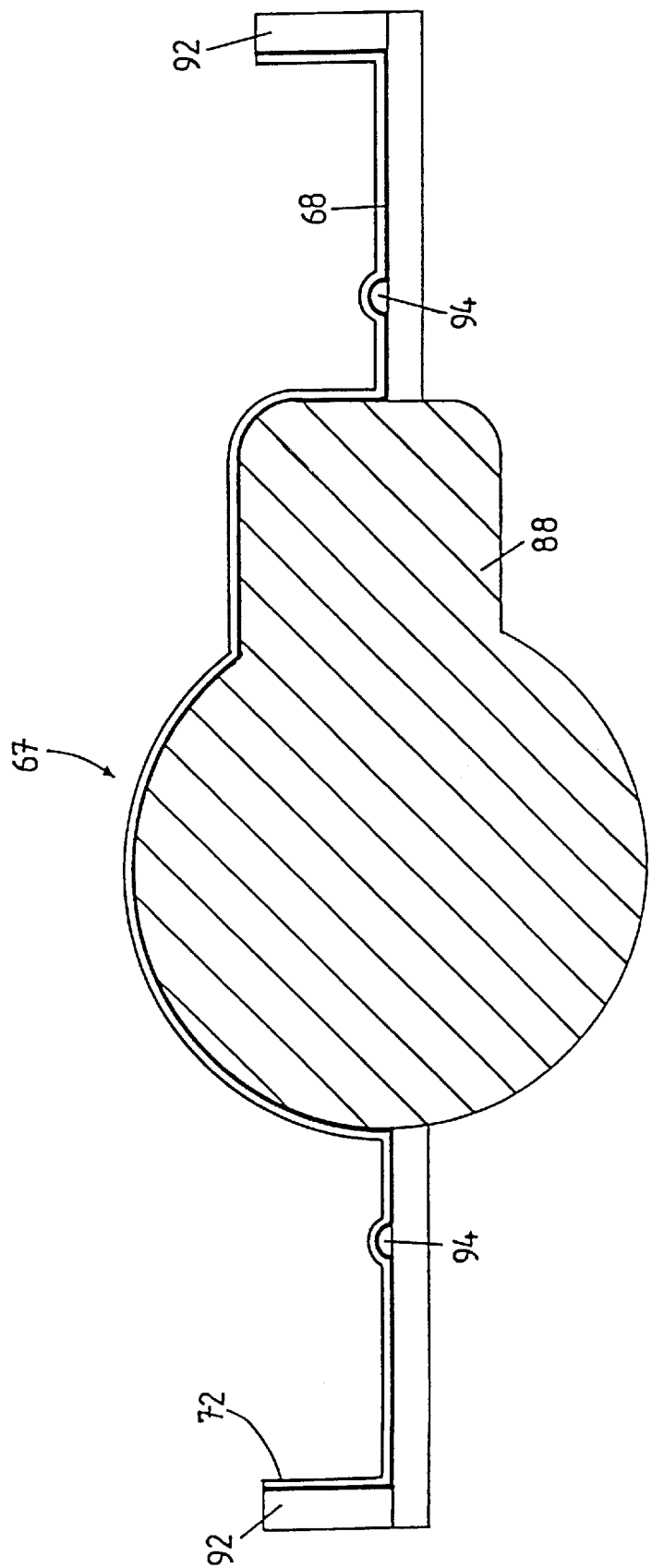

Next the second layer of mould material 72 is applied to the first layer of mould material 68 as seen in FIG. 13.

Figure 14:
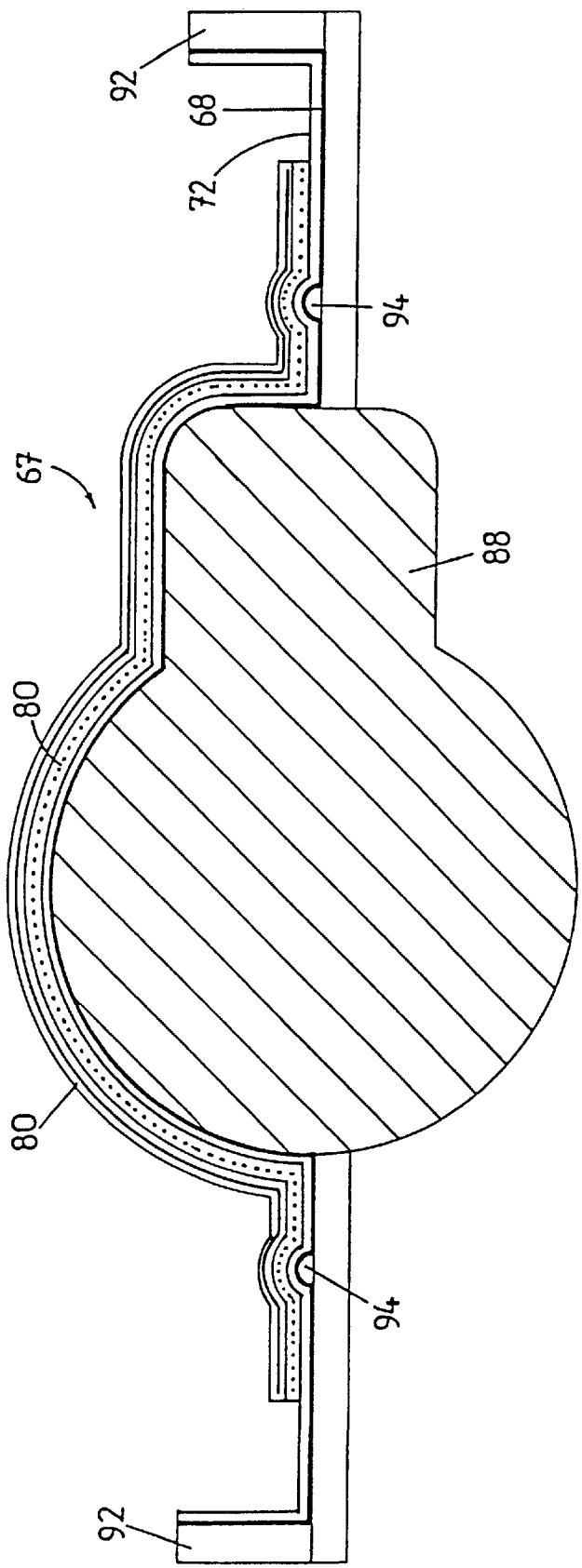

The first layer of tape 80 is then layed onto the second layer of mould material 72. Preferably, a second layer of tape 80 is then layered over the first layer of tape 80. Further, it is preferable that the second layer of tape 80 be orientated from about 45 to about 90 degrees relative to the first layer of tape 80 as seen in FIG. 14.

As will be appreciated any number of layers of tape 80 may be used and the orientation of one layer of tape 80 relative to another layer of tape 80 will be dependent upon the number of layers used.

Figure 15:
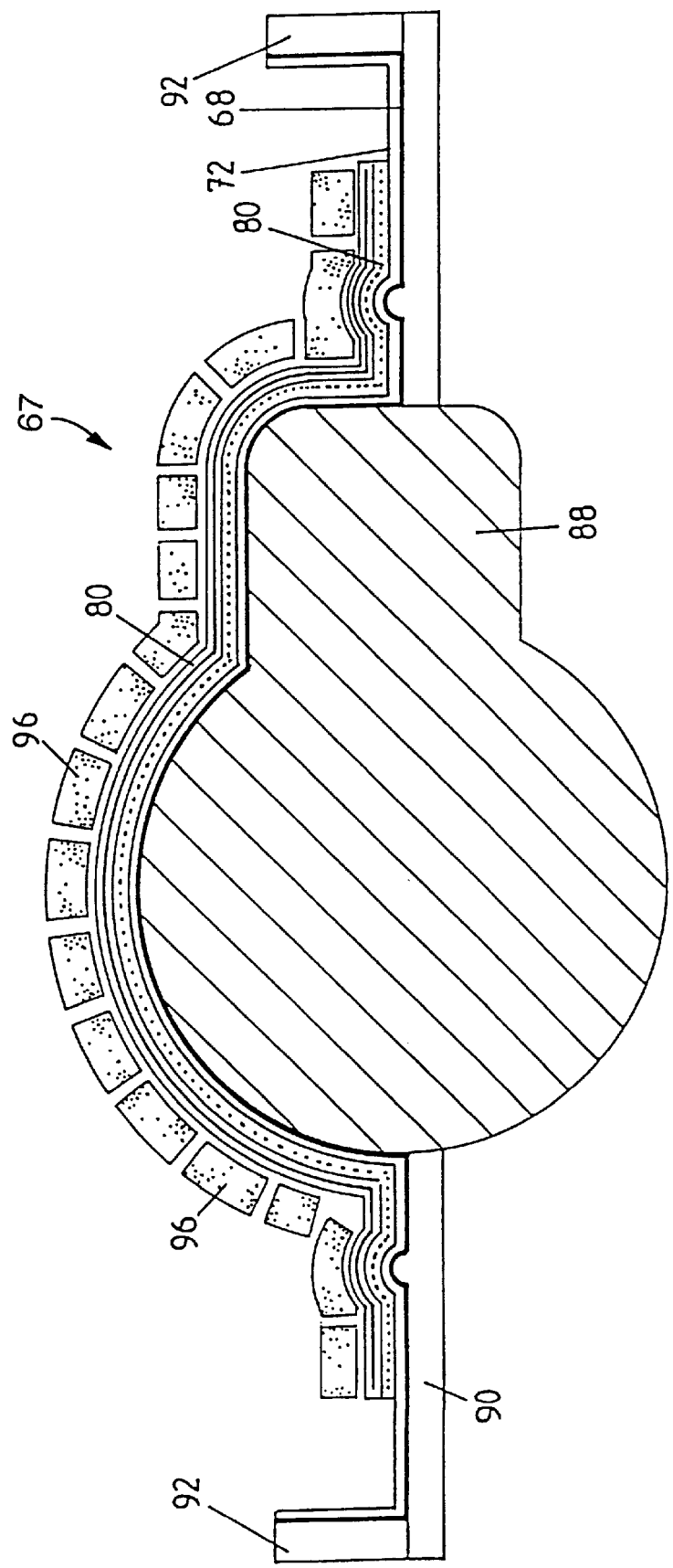

Next a plurality of duct forming means 96 are then layed onto the second layer of tape 80. Typically the duct forming means 96 are a plurality of spaced foam blocks such as polystyrene blocks secured to the layer of tape 80 by known means. The duct forming means 96 are provided in a spaced apart manner along the second layer of tape 80 as can be seen in FIG. 15.

Figure 16:
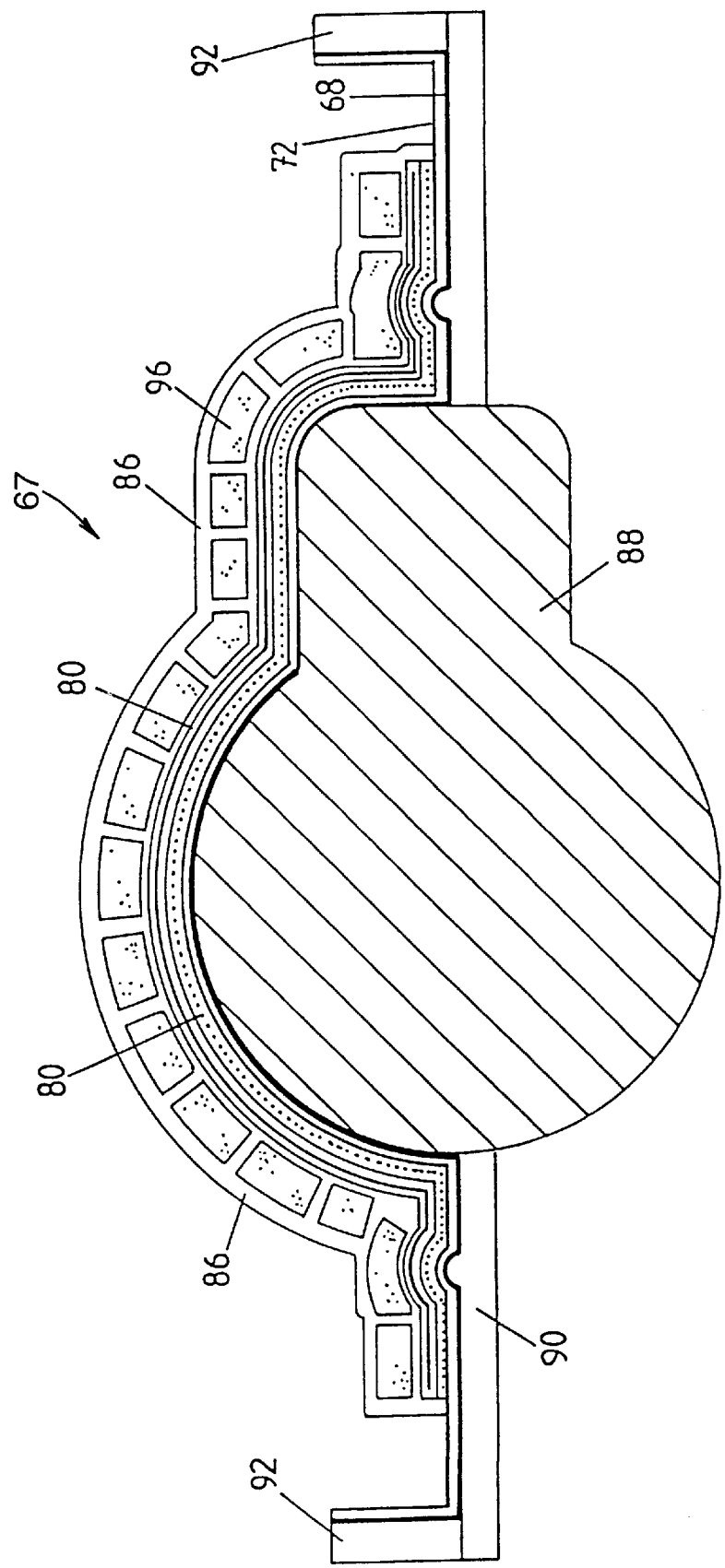

Additional mould material is then applied between and over the duct forming means 96 such that the duct forming means 96 are embedded the mould material forming the third layer of mould material 86. This is best shown in FIG. 16.

Figure 17:
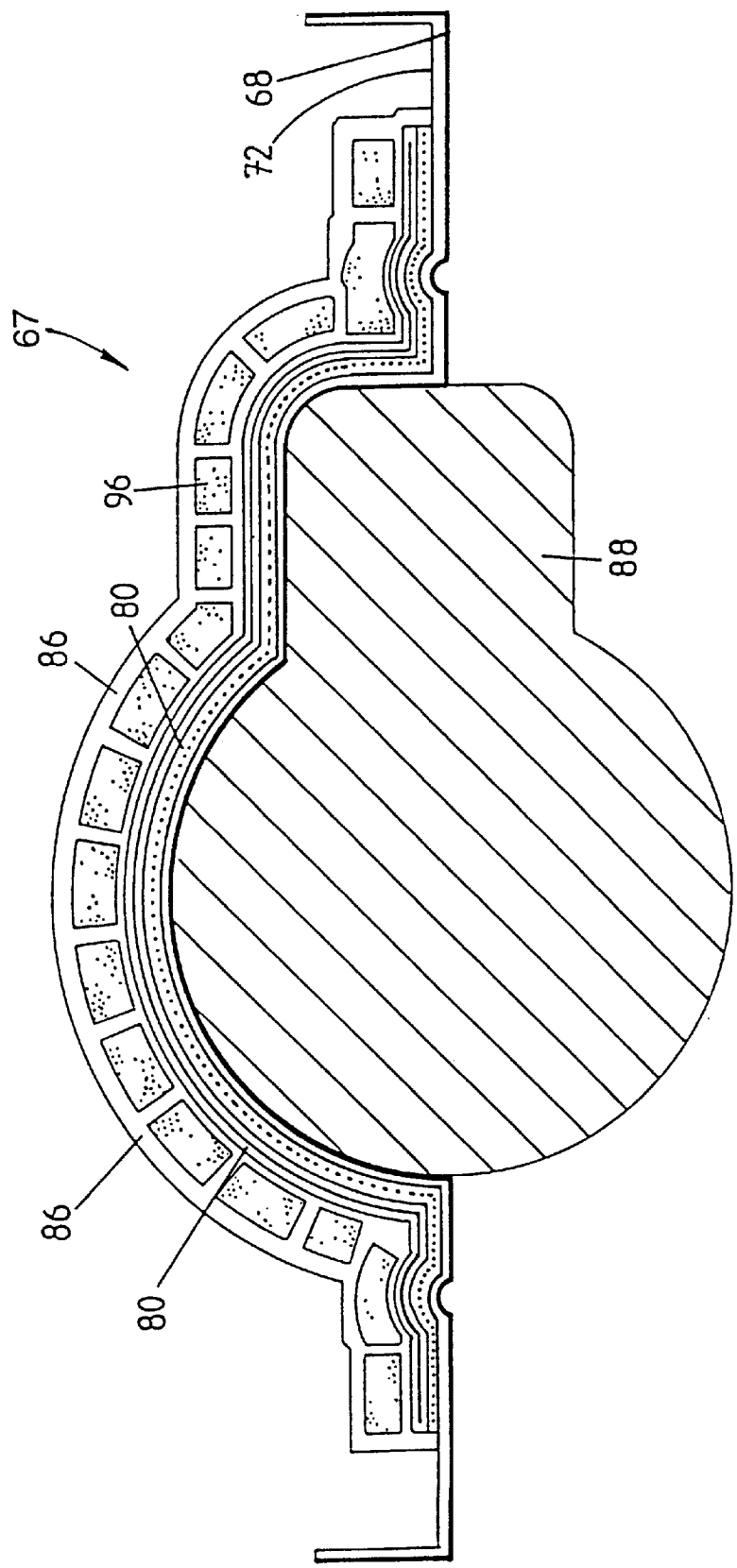

Preferably, the mould material 86 is reinforced with glass fibre or other suitable material. The mould part 67 can then be removed from the mounting plate 90 as seen in FIG. 17. The process is then repeated along each partline until the required number of mould parts 67 have been produced.

Figure 18:
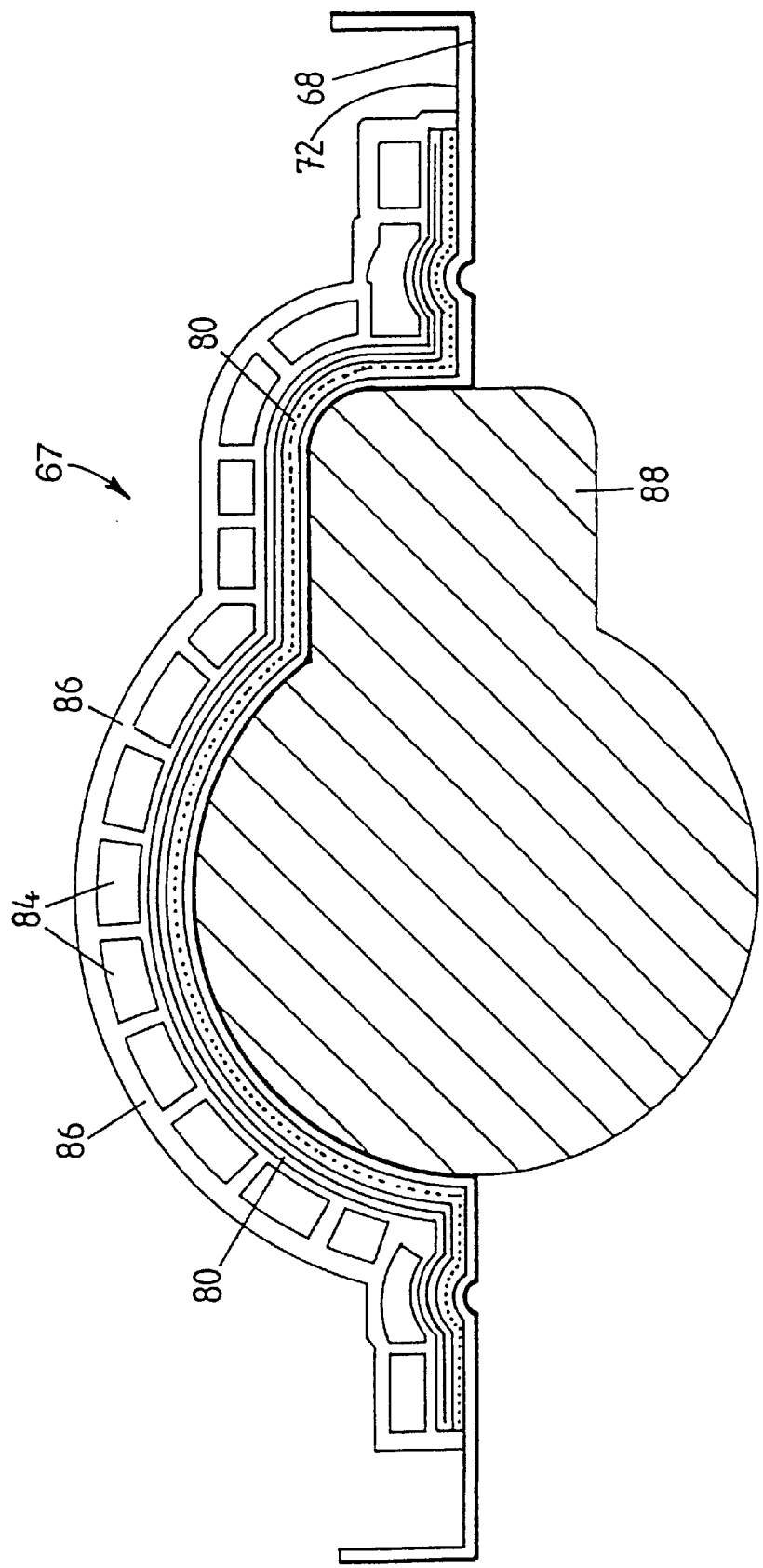

In known, manner the duct forming means such as polystyrene blocks are then dissolved out with a suitable solvent or removed by heat treatment or by other suitable treatment. This step results in the formation of the plurality of ducts 84 within the third layer of mould material 86 as shown in FIG. 18.

Further, the third layer of mould material 86 has thermal insulating properties and prevents heat loss from the mould 66.

Figure 19:
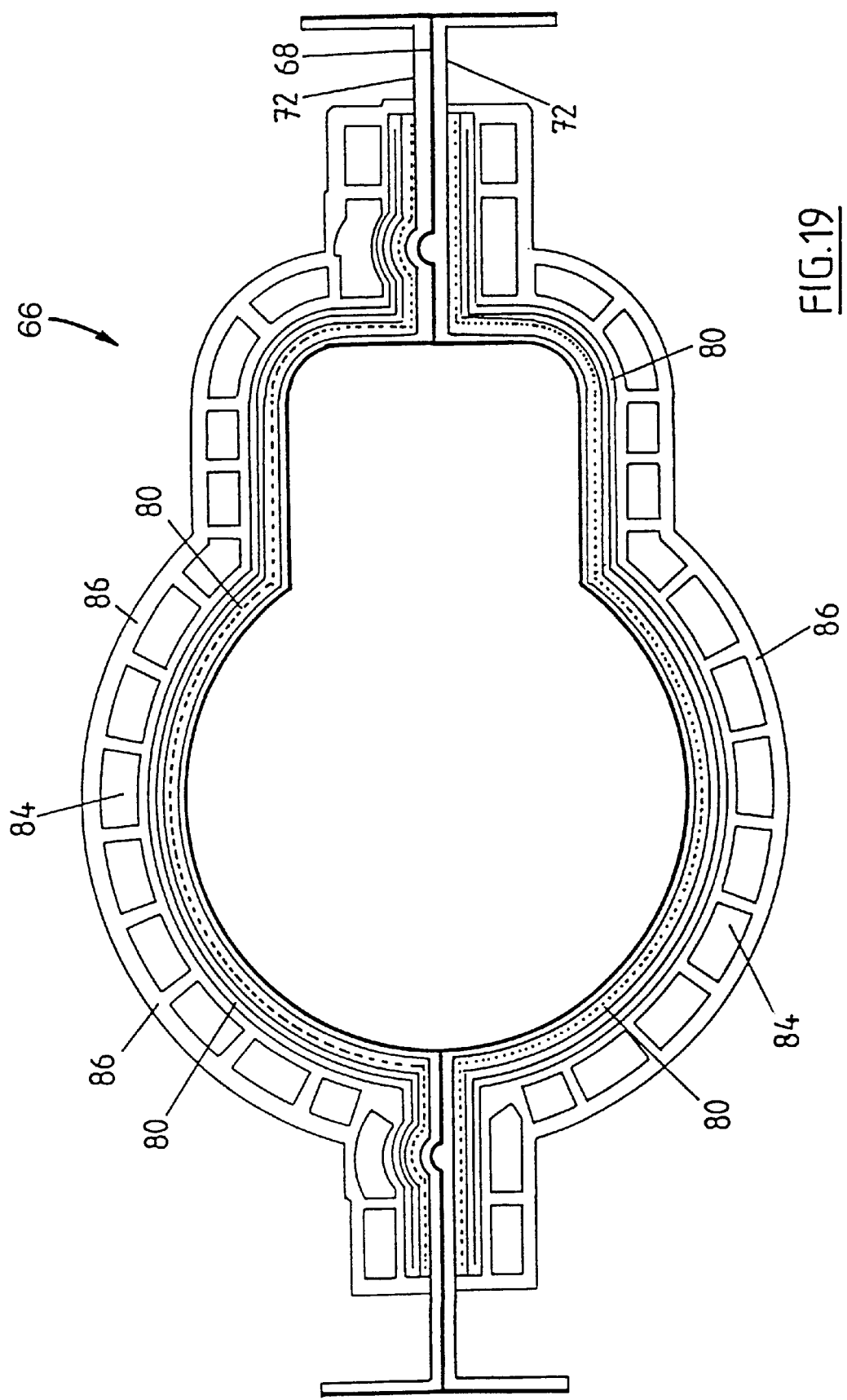
FIG. 19 is a cross sectional view showing a mould produced by the method shown in FIGS. 12 to 18.

Once all the mould parts 67 of the mould 66 have been produced, they can be assembled to form the mould 66 as shown in FIG. 19.

Connections for the nichrome wires 78 are made to provide a mechanism for heating the mould 66.

One of the advantages of the mould 66 produced as hereinbefore described in relation to FIGS. 10 to 19, resides in the efficiency of heating.

For example, the layers of materials used are substantially uniform in nature which avoids any problems associated with materials heating at different rates.

Furthermore, the arrangement of the nichrome wires 78 within the layers of tape 80 provide an even heat distribution system.

A yet further advantage of the present invention is in the event of the failure of an individual nichrome wire 78 the plurality of the nichrome wires 78 and the configuration of the multiple layers of tape 80 provide integrity of the heat transfer means 74.

In use, thermoplastics material is placed in the mould 66. In rotational moulding the mould 66 is then mounted on a rotation machine and rotated. Power is then applied to the nichrome wires 78 which generate heat within the mould 66.

Use of the mould 66 of the present invention does not require conventional heating such as a heating chamber or oven since the use of the nichrome wires 78, in the mould 66 provide heating thereof.

The heat generated heats both the mould 66 and the thermoplastics material contained therein.

Once heating has been completed, power to the nichrome wires 78 is removed. Air, water, oil or other suitable means is then pumped into the ducts 84 to effect cooling of the mould 66. When the mould 66 has cooled sufficiently for the plastics materials to remain rigid, the mould 66 is dismantled and the moulded product is removed therefrom.

During the heating phase or melt phase of the moulding cycle small air bubbles may form and be trapped in the thermoplastic material. In the present invention the air bubbles may be removed by vibrating the nichrome wires 78 integral with the mould 66 during the heating phase.

Preferably, the frequency of the AC power supplied to the nichrome wires 78 is altered in known manner. A desired frequency is selected to cause vibration of the nichrome wires 78. Such vibration of the nichrome wires 78 induces vibration of the mould 66 and the thermoplastic material contained therein. The vibration of the thermoplastics material at a desired frequency causes the air bubbles foamed therein to dissipate.

All moulding techniques require a mould release system so that the plastic product will not stick to the mould in production. The main purpose of a mould release is to form a barrier between the mould and the moulding plastic. In the past three common types of mould release have been utilised.

The first of these is transient/migratory, which were typically silicon emulsions, oils or waxs, applied to the inner surface of the mould. The transient/migratory types of mould release have disadvantages, in that they have to be constantly reapplied to the inner surface of the mould. Further they migrate with the plastic product when the product is removed from the mould. Therefore, contamination can be a problem unless stringent quality control measures are maintained. Further, as it is difficult to measure and maintain the required amount of release in the mould, poor release control of the product from the mould results therefrom. The finish obtained on the plastic product using these types of mould release is poor compared to semi-permanent and permanent mould release systems. Semi-permanent release systems, whilst meeting most requirements of rotational moulding still do not give the best results in finish of the moulded product. Further, semi-permanent release systems require constant control of their use so as to not build up and cause pre-release, coining or blooming. Further, sticking of the plastic product to the mould can be a problem if the semi-permanent release media is allowed to deteriorate. Permanent release systems are typically fluoropolymers such as, PTFE, which are baked onto the mould surface. The main disadvantage of these systems is that they require an additional process in the mould manufacture. Further, if damaged, they require specialist handling to rejuvenate the mould. The moulding process also requires particular attention to be paid to the cooling cycle so that pre-release does not occur with permanent release systems.

The mould that is the subject of the present invention has utilised a heat resistant epoxy resin as the mould material. This has the advantage that a mould release system can be included in the epoxy resin. If, for example a silicon additive is added to the epoxy the silicon will be part of the epoxy matrix so that it does not wear or degrade in operation. Further, the silicon additive will enable an inner barrier to be formed between the moulding and the mould and therefore prevent sticking of the plastic product to the mould. Further as the silicon additive is bonded into the epoxy resin, it becomes a permanent part of the mould.

Modifications and variations such as would be deemed apparent to a skilled addressee are deemed within the scope of the present invention.

I claim:

1. A multilayer mould apparatus for moulding material, the multilayer mould apparatus comprising a first layer, a second layer disposed contiguous to the first layer, the second layer including two or more superposed sheets each containing heating means, and the heating means in each sheet being oriented at an angle to the heating means in each adjacent sheet, and vibration inducing means for causing the heating means and thereby material contained in the mould to vibrate, said vibration inducing means including AC generating means for generating an AC signal at a predetermined frequency corresponding to a resonant frequency of the heating means wherein, in use, operation of the heating means causes the heating means to heat the second layer so as to transfer heat to the first layer and operation of the vibration inducing means causes dissipation of air bubbles from material contained in the mould.

2. A multilayer mould apparatus according to claim 1, wherein the sheets of the second layer are formed of woven material having heating means incorporated therein.

3. A multilayer mould apparatus according to claim 1, wherein the sheets of the second layer are formed of woven fiberglass material.

4. A multilayer mould apparatus according to claim 1, wherein the heating means is in the form of electrical heating elements.

5. A multilayer mould apparatus according to claim 4, wherein the electrical heating elements are resistance wires.

6. A multilayer mould apparatus according to claim 1, wherein the heating means in each sheet are oriented from about 45 to about 90 degrees relative to the heating means in each adjacent sheet.

7. A multilayer mould apparatus according to claim 1, wherein there is provided a third layer contiguous to the second layer wherein the third layer contains a cooling means.

8. A multilayer mould apparatus according to claim 7, wherein the cooling means includes at least one duct arranged to receive a cooling medium.

9. A multilayer mould apparatus according to claim 7, wherein the cooling means includes at least one pipe arranged to receive a cooling medium.

10. A multilayer mould apparatus according to claim 1, further including a release agent incorporated into the first layer.

\* \* \* \* \*